US012244469B2

(12) United States Patent
Grushka et al.

(10) Patent No.: US 12,244,469 B2
(45) Date of Patent: Mar. 4, 2025

(54) SYSTEM AND METHOD FOR SUPERVISED EVENT MONITORING

(71) Applicant: Microsoft Technology Licensing, LLC, Redmond, WA (US)

(72) Inventors: Hagit Grushka, Beer-Sheva (IL); Rachel Lemberg, Herzliya (IL); Yaniv Lavi, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/077,568

(22) Filed: Dec. 8, 2022

(65) Prior Publication Data
US 2024/0195702 A1   Jun. 13, 2024

(51) Int. Cl.
| | |
|---|---|
| H04L 41/16 | (2022.01) |
| G06F 11/07 | (2006.01) |
| G06F 11/30 | (2006.01) |
| G06F 11/34 | (2006.01) |
| G06N 20/00 | (2019.01) |
| H04L 41/5009 | (2022.01) |

(52) U.S. Cl.
CPC .......... *H04L 41/16* (2013.01); *G06F 11/3006* (2013.01); *G06F 11/3447* (2013.01); *G06N 20/00* (2019.01); *H04L 41/5009* (2013.01); *G06F 11/0709* (2013.01); *G06F 11/3409* (2013.01); *G06F 2201/81* (2013.01)

(58) Field of Classification Search
CPC ............. G06F 11/0709; G06F 11/3006; G06F 11/3409; G06F 11/3447; G06F 2201/81; H04L 41/16; H04L 41/5009
See application file for complete search history.

(56) References Cited

U.S. PATENT DOCUMENTS

| | | | |
|---|---|---|---|
| 10,931,692 B1 * | 2/2021 | Mota | G06N 20/00 |
| 11,582,628 B2 * | 2/2023 | Chen | H04W 24/08 |
| 2015/0067857 A1 * | 3/2015 | Symons | G06N 20/00 726/23 |
| 2020/0005096 A1 * | 1/2020 | Calmon | G06N 20/10 |
| 2021/0203673 A1 * | 7/2021 | dos Santos | H04L 63/1408 |
| 2021/0337393 A1 * | 10/2021 | Wainer | G06N 5/01 |
| 2022/0066906 A1 * | 3/2022 | Kumar | G06F 11/3419 |
| 2022/0103592 A1 * | 3/2022 | Semel | H04L 63/20 |
| 2022/0350317 A1 * | 11/2022 | Tanaka | G05B 19/41875 |
| 2022/0413983 A1 * | 12/2022 | Mathew | G06N 3/006 |
| 2024/0037224 A1 * | 2/2024 | Norgate | G06F 21/552 |

FOREIGN PATENT DOCUMENTS

WO   2022000398 A1   1/2022

OTHER PUBLICATIONS

International Search Report and Written Opinion received for PCT Application No. PCT/US23/036829, Mar. 5, 2024, 16 pages.

* cited by examiner

*Primary Examiner* — Thomas J Dailey
(74) *Attorney, Agent, or Firm* — Brian J. Colandreo; Heath M. Sargeant; Holland & Knight LLP

(57) ABSTRACT

A method, computer program product, and computing system for processing event data associated with a plurality of known operational impact events on a business service and operational data associated with the business service using a supervised machine learning model conditioned on an operational impact parameter associated with the business service. A detection threshold is generated using the supervised machine learning model.

17 Claims, 7 Drawing Sheets

SYSTEM AND METHOD FOR SUPERVISED EVENT MONITORING

BACKGROUND

During the operation of business services (i.e., infrastructure, platforms, and/or software that are hosted by providers and made available to users), events often occur which impact business service performance. As such, operational data from the service can be indicative of the operational impact of an event on the business service. For example, during a natural disaster or storm, a server loses power and the service performance changes (e.g., a disruption in a server results in slower performance). In this example, the event (e.g., the server losing power) and the operational data showing slower server performance define an operational impact event for the service (e.g., the server losing power results in lower service performance). However, not all operational data is indicative, or at least not meaningfully indicative, of operational impacts on the business service. As such, determining whether an event is an operational impact event from noisy operational data using statistical approaches may be inefficient or prone to errors.

BRIEF DESCRIPTION OF THE DRAWINGS

Like reference symbols in the various drawings indicate like elements.

DETAILED DESCRIPTION

Conventional methods for detecting operational impact events (i.e., events that cause an impact in the operation of a business service) for a service using operational data (e.g., telemetry data and/or service level indicator (SLI) data) are prone to errors. For example, conventional approaches for detecting operational impact events are unsupervised (i.e., a machine learning paradigm for problems where the available data consists of unlabeled examples). Examples of unsupervised learning tasks include clustering, dimension reduction, density estimation, and other anomaly-based approaches. For instance, suppose a normal range of latency for a business service is 800 milliseconds to 1,200 milliseconds. Suppose that operational data for the business service reports higher than normal latency (e.g., 1,600 millisecond latency). In this example, a conventional unsupervised approach would detect an operational impact event for the business service as the 1,600 millisecond latency is out of the normal latency range.

However, this conventional approach does not account for whether or not an operational impact event is actually observed because of the increased latency. For example, suppose that an operational impact on a business service (e.g., degraded performance) is not observed unless the latency exceeds a higher threshold, e.g., 3,000 milliseconds. In this example and according to various implementations of the present disclosure, labeled event information indicating that an operational impact event is not observed unless the latency exceeds e.g., 3,000 milliseconds, can be used to supervise a machine learning model's training to discriminate operational data into operational data indicative of an operational impact on the business service (i.e., an operational impact event) and operational data not indicative of an operational impact on the business service. Accordingly, implementations of the present disclosure reduce noisy operational data and enhance the detection accuracy for operational data that is indicative of an operational impact event.

The details of example implementations are set forth in the accompanying drawings and the description below. Other features and advantages will become apparent from the description, the drawings, and the claims.

Figure 1:
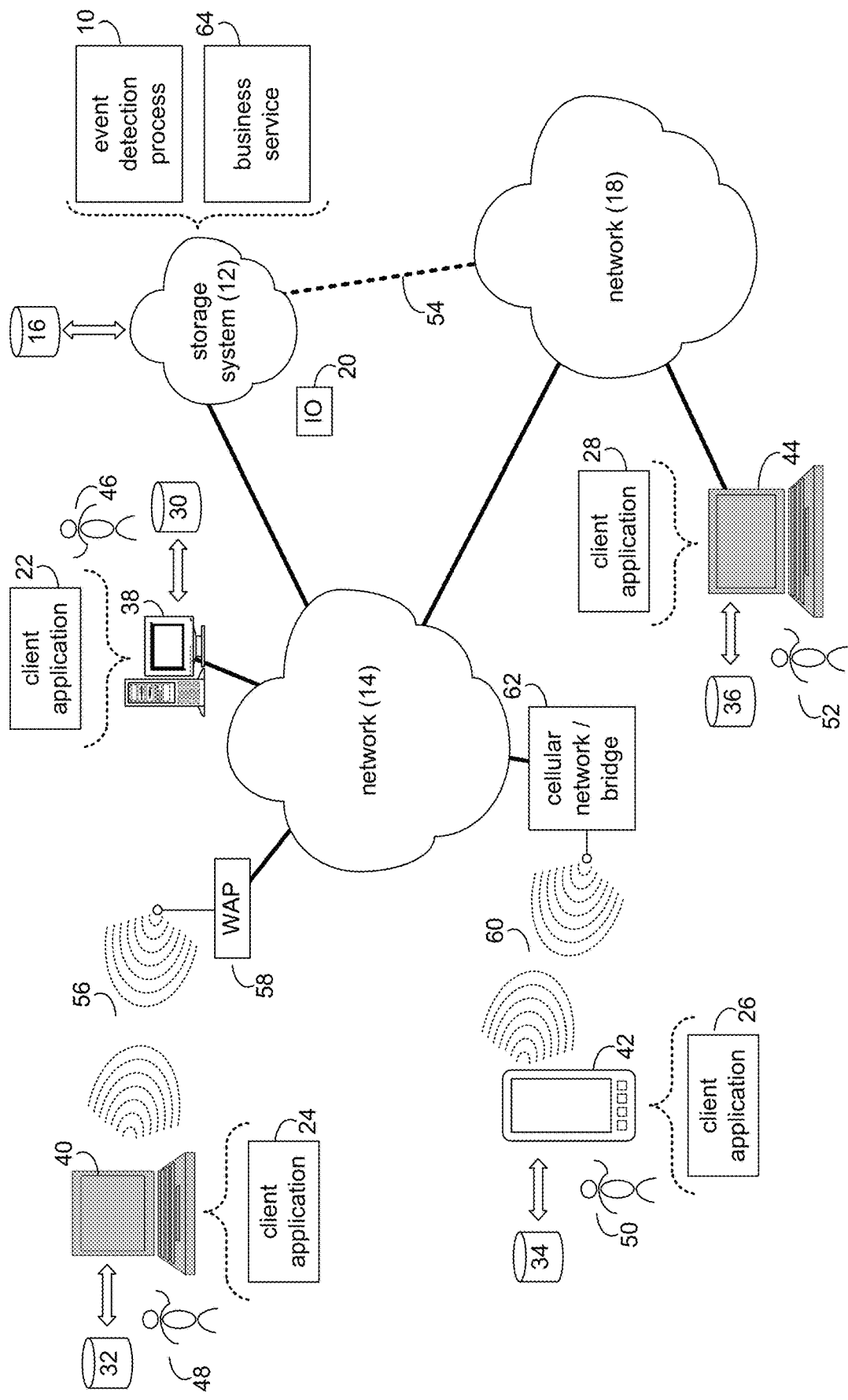
FIG. 1 is a diagrammatic view of an example computer system and an event detection process coupled to a distributed computing network.

System Overview:

Referring to FIG. 1, an event detection process 10 is shown to reside on and is executed by storage system 12, which is connected to network 14 (e.g., the Internet or a local area network). Examples of storage system 12 include: a Network Attached Storage (NAS) system, a Storage Area Network (SAN), a personal computer with a memory system, a server computer with a memory system, and a cloud-based device with a memory system. A SAN includes one or more of a personal computer, a server computer, a series of server computers, a mini computer, a mainframe computer, a RAID device, and a NAS system.

The various components of storage system 12 execute one or more operating systems, examples of which include: Microsoft® Windows®; Mac® OS X®: Red Hat® Linux, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both: Red Hat is a registered trademark of Red Hat Corporation in the United States, other countries or both; and Linux is a registered trademark of Linus Torvalds in the United States, other countries or both).

The instruction sets and subroutines of event detection process 10, which are stored on storage device 16 included within storage system 12, are executed by one or more processors (not shown) and one or more memory architectures (not shown) included within storage system 12. Storage device 16 may include: a hard disk drive; an optical drive; a RAID device; a random access memory (RAM); a read-only memory (ROM); and all forms of flash memory storage devices. Additionally or alternatively, some portions of the instruction sets and subroutines of event detection process 10 are stored on storage devices (and/or executed by processors and memory architectures) that are external to storage system 12.

In some implementations, network 14 is connected to one or more secondary networks (e.g., network 18), examples of which include: a local area network: a wide area network: or an intranet.

Various input/output (IO) requests (e.g. IO request 20) are sent from client applications 22, 24, 26, 28 to storage system 12. Examples of IO request 20 include data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include: hard disk drives; tape drives: optical drives: RAID devices; random access memories (RAM): read-only memories (ROM), and all forms of flash memory storage devices. Examples of client electronic devices 38, 40, 42, 44 include personal computer 38, laptop computer 40, smartphone 42, laptop computer 44, a server (not shown), a data-enabled, and a dedicated network device (not shown). Client electronic devices 38, 40, 42, 44 each execute an operating system.

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, laptop computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi®, and/or Bluetooth® device that is capable of establishing a wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

The Event Detection Process:

Referring at least to FIGS. 2-7, event detection process 10 processing 200 event data associated with a plurality of known operational impact events on a business service and operational data associated with the business service using a supervised machine learning model conditioned on an operational impact parameter associated with the business service. A detection threshold is generated 202 using the supervised machine learning model.

As will be discussed in greater below; implementations of the present disclosure allow for the supervised monitoring and detection of operational impact events from known operational impact events and operational data associated with events. During operation of a business service (e.g., a cloud service), various events (i.e., natural disasters, routine maintenance, unplanned system upgrades, technological failures, unanticipated user bandwidth, etc.)) occur that may or may not represent an operational impact in the performance of the business service. In some implementations, an event may be detected or indicated by event data (e.g., an alert, a communication, or other indication associated with a business service). In one example, suppose a storm disrupts power to a server associated with a business service and event data is received indicating that the storm has disrupted power to the server. In this example, with the disrupted power, operational data shows a decrease in business service performance. As such, this operational data (e.g., the decrease in business service performance) is an operational impact event because the operation of the business service is affected (e.g., degraded business service performance). In another example, normal business service functionality is observed as no event alerts are reported even when operational data indicates increased latency. As such, known operational impact events and corresponding operational data allow for the detection of operational impact events. Specifically, by using known operational impact events and operation data for supervised training, noisy operational data is filtered and the detection of operational impact events from operational data is enhanced. In this manner, operational impact events are automatically monitored and accurately detected during the operation of the business service using various types of operational data.

In some implementations, a business service generally includes infrastructure, platforms, and/or software that is hosted by providers and made available to users for electronic data processing, data management, and/or data storage. In each of these examples, access to the business service may be effectuated using electronic devices. In this manner, business services may include cloud computing services that utilize electronic computing devices (e.g., mobile phones, desktop computers, laptop computers, tablets).

In one example, a business service is a data storage service. As shown in FIG. 1, a data storage service (e.g., business service 64) allows data from various computing devices (e.g., client electronic devices 38, 40, 42, 44) to independently access data stored in computer system 12. In this manner, computer system 12 provides "cloud-based" storage access for client electronic devices 38, 40, 42, 44. During the operation of business service 64, various events may occur that impact the operation of the business service. For example, suppose business service 64 in addition to computer system 12, includes various computer systems across various locations. In one example, access to one of the computer systems is temporarily disabled (e.g., during routine maintenance). In another example, a particular computer system may experience a natural disaster disrupting communication between the computer system and client electronic devices.

At any point in time before, during, or after such operational impacts, event data (e.g., alerts, communications, or other indications associated with a business service) may be observed concerning an event that impacts the operation of the business service. For example, an electronic communication or email may be sent to users of business service 64 e.g., alerting them of an upcoming or scheduled operational impact in business service 64. In another example, an outage mapping system maintained by business service 64 or others may provide a listing of operational impacts. In another example, an electronic feed or social media platform may publish messages from users and/or system administrators regarding operational impacts in the business service. In each of these cases, event data (e.g., electronic communication, outage mapping system, listing of operational impacts) is generated that indicates an event associated with the business service. In one example, event data includes an individual "ticket" of a ticket management system associated with a business service. In another example, event data includes an alert or other message associated with an impact (e.g., an outage) observed by a monitoring system associated with the business service. In another example, event data includes a communication (e.g., an email or social media post) regarding the status of the business service. While several examples of types of event data have been provided, it will be appreciated that any type of event data may be used within the scope of the present disclosure.

In some implementations, event detection process 10 optionally receives a plurality of event data associated with a plurality of known operational impact events on a business service, respectively. In one example, suppose a particular operational impact event (e.g., an outage of the respective business service) is observed through event data (e.g., a ticket from a ticket management system). In this example, the ticket from the ticket management system is event data associated with a known operational impact event (e.g., outage of the business service). In another example, suppose event data (e.g., social media posting regarding unavailability of the business service) occurs at the time of a known operational impact event (e.g., a storage system failure). In this example, the social media posting is event data associated with a known operational impact event (e.g., the storage system failure).

In some implementations, receiving a plurality of event data includes requesting or polling for particular event data (e.g., at one time or periodically) from various sources (e.g., ticket management systems, internal or external operational status management tracking systems, particular social media or social network feeds or users, and/or service level indicator information generated internally or by external systems). In some implementations, the plurality of events includes time information, location information, and information pertaining to operational impact event (e.g., loss of business service, reduced business service). As discussed above, the plurality of event data is associated with a known operational impact on the business service.

In some implementations, the plurality of event data associated with the plurality of known operational impact events on the business service includes a plurality of event data associated with a plurality of known operational impact events on a cloud computing service. For example, cloud computing services provide on-demand availability of computer system resources, for example, data storage and computing power. Large cloud computing services often have functions distributed over multiple locations, each location being a data center. Examples of cloud computing services include Microsoft® Azure® from Microsoft Corporation in the United States, Amazon Web Services™ (AWS™) from Amazon.com, Inc., and Google Cloud Platform™ from Google LLC. In one example, event detection process 10 receives a plurality of event data associated with a plurality of known operational impact events on a cloud computing service. However, it will be appreciated that other various event data associated with known operational impact events on any kind of business service may be received within the scope of the present disclosure.

In some implementations, event detection process 10 processes 200 event data associated with a plurality of known operational impact events on a cloud computing service and operational data associated with the cloud computing service using a supervised machine learning model conditioned on an operational impact parameter associated with the cloud computing service. As will be discussed in greater detail below, an operational impact parameter is a parameter that is used to determine the least sensitive or lowest detection threshold to achieve a particular performance metric. In some implementations, operational data includes telemetry data and performance data indicative of the performance of the business service (e.g., latency, throughput, reliability) associated with a business service. For example, suppose a business service includes an application installed on a client electronic device that interacts with a server. In this example, operational data indicative of the performance of the business service on the client electronic device (e.g., latency, throughput) is generated and transmitted to a predefined resource for processing. For example, operational data is aggregated or processed for individual client devices depending on the application.

In some implementations, the operational data includes service level indicator (SLI) data. SLI data is a measure of the service level of a business service. For example, many business services include a service level agreement (SLA) that defines measurable metrics that describe the performance of the business service for a particular customer. SLI data is the measurement of the metrics defined by the SLA. Examples of SLI data include: latency, throughput, availability, and error rate; durability (in storage systems), end-to-end latency (for complex data processing systems, especially pipelines), and correctness. It will be appreciated that various types of SLI data may be utilized within the scope of the present disclosure as operational data associated with a particular business service.

In some implementations, event detection process 10 utilizes a supervised machine learning model to process the plurality of event data and operational data associated with the business service to generate a detection threshold. A machine learning model generally includes an algorithm or combination of algorithms trained to recognize certain types of patterns. For example, machine learning approaches are generally divided into three categories, depending on the nature of training data: supervised learning, unsupervised learning, and reinforcement learning. Supervised learning includes presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). Reinforcement learning generally includes a computing device interacting in a dynamic environment in which it must perform a certain goal (such as driving a vehicle or playing a game against an opponent). As it navigates its problem space, the program is provided feedback that is analogous to rewards, which it tries to maximize. As described above, if labeled training data is available to "teach" a machine learning model, the machine learning model is supervised. If labeled training data is unavailable, the machine learning model is unsupervised. If the machine learning model receives feedback to influence the model, the machine learning model is a reinforcement machine learning model. While three examples of machine learning approaches have been provided, it will be appreciated that other machine learning approaches are possible within the scope of the present disclosure.

In some implementations, the supervised machine learning model is conditioned on (i.e., trained with) an operational impact parameter. An operational impact parameter is a parameter that is used to determine the least sensitive or lowest detection threshold to achieve a particular performance metric. For example, suppose that business service 64 is a cloud computing service. In this example, the operational impact parameter is a minimum performance metric of the cloud computing service. In one example, the operational impact parameter is a minimum percentage of or number of client devices experiencing an operational impact while using the cloud computing service. The operational impact parameter may be a default value or may be user-defined. While an example of a single operational impact parameter has been described above, it will be appreciated that any number of operational impact parameters for various metrics concerning an operational impact may be used to condition the supervised machine learning model within the scope of the present disclosure.

In some implementations, event detection process 10 processes 200 the plurality of event data and operational data associated with the business service using a supervised machine learning model conditioned on an operational impact parameter associated with the business service to identify features of the plurality of events. For example, in addition to detection thresholds, event detection process 10 utilizes the supervised machine learning model to identify features of the event data associated with a known operational impact event. In one example, suppose an event concerns the unavailability of a particular business service (e.g., a cloud-based storage service is unavailable for many client devices as reported via a feedback ticketing system). In this example, event detection process 10 identifies (e.g., via a supervised machine learning model) features or factors that contribute to the known operational impact event. In this example, suppose that SLI data indicates a significant increase in latency experienced by the cloud-based storage service leading up to the unavailability. Accordingly, event detection process 10 identifies this feature (e.g., significant latency increase) associated with the known operational impact event. In this manner, event detection process 10 may associate or correlate particular features in the operational data with specific operational impact events of a business service. In some implementations, event detection process 10 utilizes this mapping of particular features in the operational data to enhance the monitoring and detection of operational impact events.

In some implementations, event detection process 10 generates 202 a detection threshold using the supervised machine learning model. For example, event detection process 10 generates 202 a detection threshold by processing the plurality of known operational events and operational data associated with the business service using a supervised machine learning model conditioned on an operational impact parameter associated with the business service. A detection threshold is the criteria of operational data that divides operational data indicative of an operational impact event from operational data not indicative of an operational impact event using the plurality of known operational impact events. In some implementations, event detection process 10 generates 202 a detection threshold by training the supervising machine learning model with known operational impact events and operational data associated with known operational impact events. For example, with labeled training data (i.e., known operational impact events and corresponding operational data), event detection process 10 generates 202 a detection threshold using the supervised machine learning model that divides operational data indicative of an operational impact event from operational data not indicative of an operational impact event using the plurality of known operational impact events.

Figure 3:
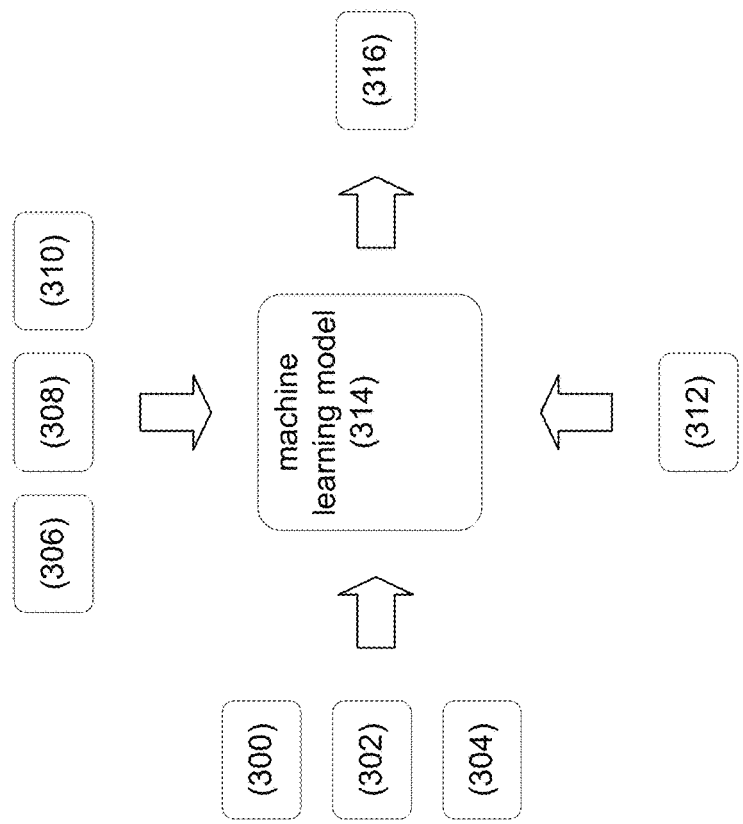
FIGS. 3-5 are diagrammatic views of example event detection processes of FIG. 1.

For example and referring also to FIG. 3, suppose that event detection process 10 process 200 a plurality of event data associated with known operational impact events (e.g., plurality of event data 300, 302, 304) indicating that e.g., a storage system associated with a business service has failed. Further suppose that the operational data (e.g., operational data 306, 308, 310) indicates that during the operational impact events associated with event data 300, 302, 304, client latency exceeds e.g., 3,000 milliseconds. In this example, an operational impact parameter (e.g., operational impact parameter 312) is defined as e.g., 10%, meaning that the supervised machine learning model (e.g., supervised machine learning model 314) is conditioned on generating a detection threshold (e.g., detection threshold 316) that is the least sensitive or smallest criteria that will detect at least e.g., 10% deviating client devices. In other words, detection threshold 316 represents the minimum criteria for operational data (e.g., latency in this example) for detecting an operational impact in at least 10% of client devices of business service 64.

In some implementations, generating 202 the detection threshold using the supervised machine learning model includes determining 204 a number of false positive detections, and generating 206 a plurality of detection thresholds when the number of false positive detections exceeds a false positive detection threshold. For example, there may be instances where a single global detection threshold is less effective than multiple discrete detection thresholds. Suppose a single detection threshold is so low that significant amounts of noisy operational data results in false positive detections in order to cover all of the plurality of business events associated with known operational impact events. In this example, event detection process 10 determines whether the use of multiple detection thresholds is more efficient than a single detection threshold by determining 204 a number of false positive detections compared to a number of detection thresholds. If the number of false positive detections is over a predefined threshold, event detection process 10 generates 206 multiple detection thresholds.

In some implementations, baseline computed algorithms generate a prediction and "borders" or detection thresholds around the predictions to apply a particular level of sensitivity. For example, "3-Sigma" is based on selecting the average as a prediction and building around it (e.g., three times the standard deviation of the metric). In this manner, everything inside the three sigma boundaries is considered "normal" and everything outside of the boundaries is "deviating". However, a "2-sigma" approach (e.g., two times the standard deviation), may be used for a more sensitive model and a "4.5-sigma" approach (e.g., four-point-five times the standard deviation) may be used for a very insensitive model. While various examples of granularities have been discussed, it will be appreciated that any sigma value may be used within the scope of the present disclosure.

In some implementations, event detection process 10 generates 206 a different detection threshold for each "split" or grouping of operational data. For example, event detection process 10 generates different detection thresholds based on different metrics associated with the operational data. In one example, event detection process 10 generates 206 a plurality of detection thresholds for different groups of operational data based on the e.g., location or geographic region of the operational data. In another example, event detection process 10 generates a different detection threshold based on various tiers or quality of service layers for the business service. While several examples have been provided for various groupings of operational data and detection thresholds, it will be appreciated that these are for example purposes only and that any number of or type of detection threshold may be used within the scope of the present disclosure.

In some implementations, event detection process 10 determines 208 coverage of plurality of known operational impact events using the detection threshold, and identifies 210 a gap in the coverage of the plurality of known operational impact events. For example, event detection process 10 evaluates blind spots in coverage of the metrics for the operational data collected. If a dynamic supervised machine learning model or algorithm that differentiates the labeled business events is not found, event detection process 10 indicates that the coverage of the collected operational data is incomplete. In one example, the dynamic supervised machine learning model is a supervised learning tool that identifies a hypersphere in an N-dimensional space to differentiate the known operational impact events from one another and/or events without operational impacts. In another example, the dynamic supervised machine learning model is a supervised learning tool that identifies a hyperplane in an N-dimensional space to classify the known operational impact events. In another example, the dynamic supervised machine learning model is a supervised learning tool that identifies a hyperrectangle in an N-dimensional space to differentiate known operational impact events into multiple classes of known operational impact events. In another example, the dynamic supervised machine learning model is a supervised learning tool that identifies a hypercube in an N-dimensional space to differentiate known operational impact events from one another.

In some implementations, most operational data (e.g., SLI signals) have poor quality and correlation with events (e.g., outages). In this case, trying to cover all known operational impact events will result in a high level of noise. In this manner, event detection process 10 identifies 210 a gap in the coverage of the plurality of known operational impact events. In some implementations, event detection process 10 uses clustering analysis to understand which operational impact events are being covered by which operational data.

In some implementations and in addition to identifying 210 a gap in the coverage of the plurality of known operational impact events, event detection process 10 validates the coverage and quality of the monitoring of the plurality of known operational impact events. For example and as discussed above, if a supervised machine learning model (e.g., a hypersphere) that differentiates the labeled business events cannot be found or determined, event detection process 10 indicates that the coverage of the collected operational data is incomplete. In some implementations, event detection process 10 generates a report of uncovered operational data and/or uncovered known operational impacts. In one example, event detection process 10 determines that, based on the number of uncovered known operational impact events and/or uncovered operational data, the monitoring configuration is ineffective against actual operational impact events. In this manner, monitoring effectiveness can be determined and updated in real-time by identifying gaps in coverage both in terms of uncovered operational data and uncovered known operational impact events.

Figure 4:
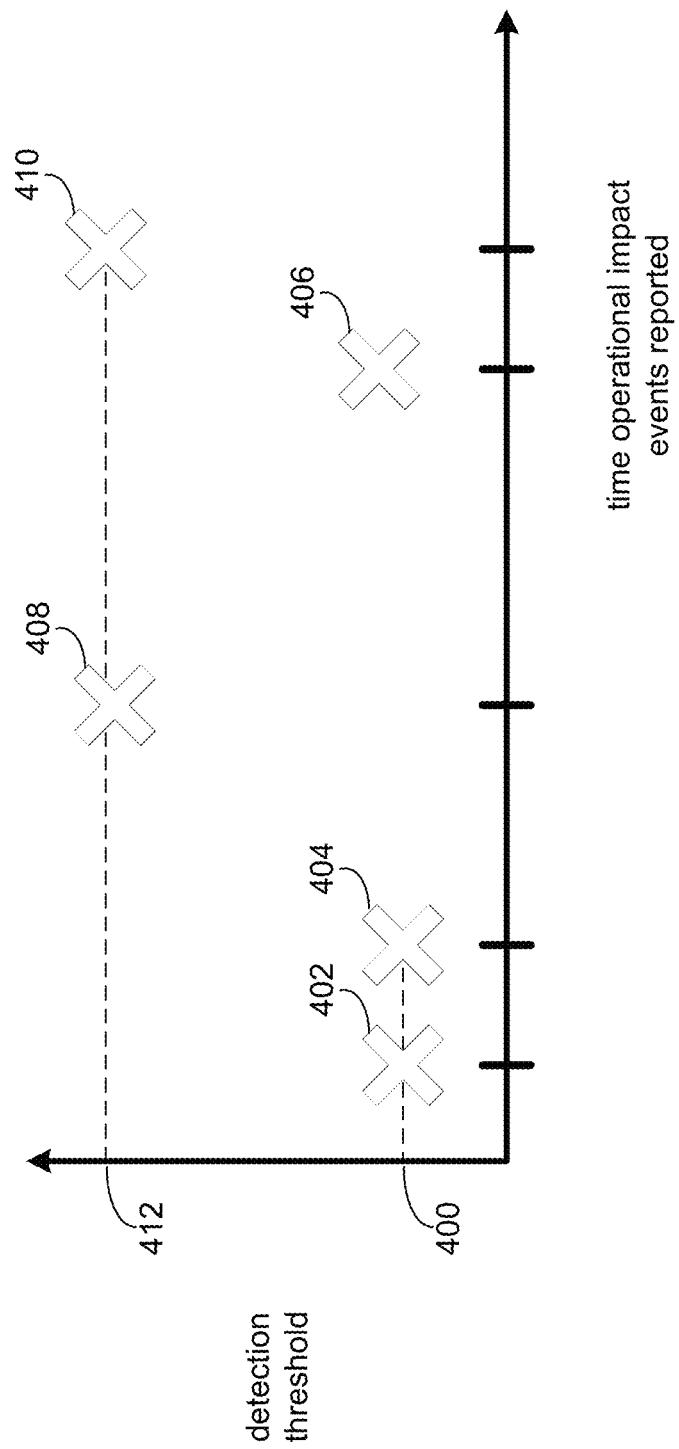

Referring also to FIG. 4, suppose that event detection process 10 receives a plurality of event data associated with known operational impact events and processes 200 the plurality of event data and operational data to generate 202 a detection threshold. In this example, suppose that supervised machine learning model 314 determines that detection threshold 400 would cover events 402, 404, 406, 408, 410. However, further suppose that supervised machine learning model 314 determines that another detection threshold (e.g., detection threshold 412) would cover events 408, 410 without detecting events 402, 404, 406. In this example, event detection process 10 may determine that using detection threshold 400 for detecting events 408, 410 introduces too much "noise" as events 402, 404, 406 are distinct from events 408, 410. In this manner, event detection process 10 may generate a plurality of detection thresholds (e.g., detection thresholds 400, 412) to account for various clusters or concentrations of operational impact events.

Figure 2:
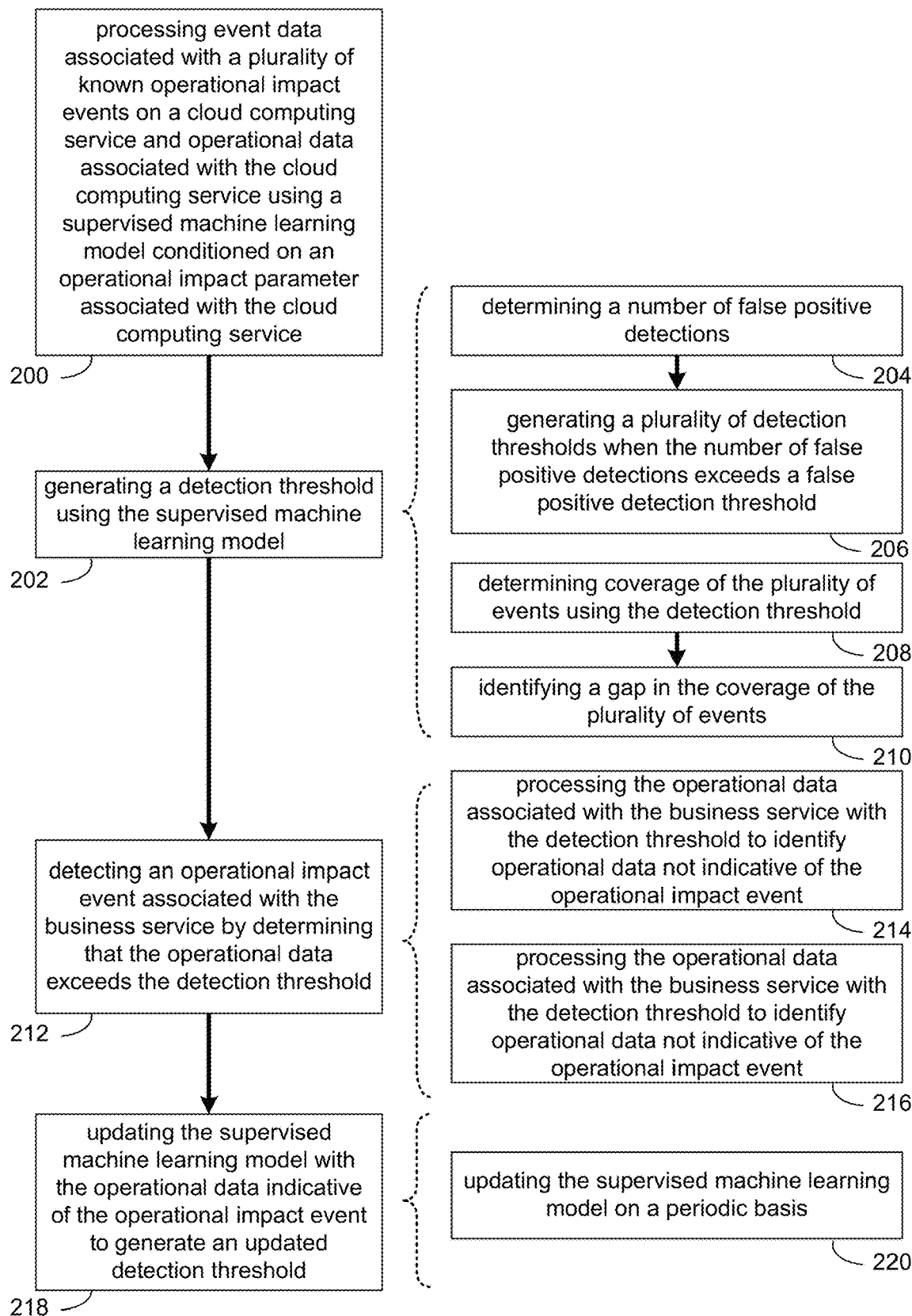
FIG. 2 is a flow chart of an example implementation of the event detection process of FIG. 1.
Figure 6:
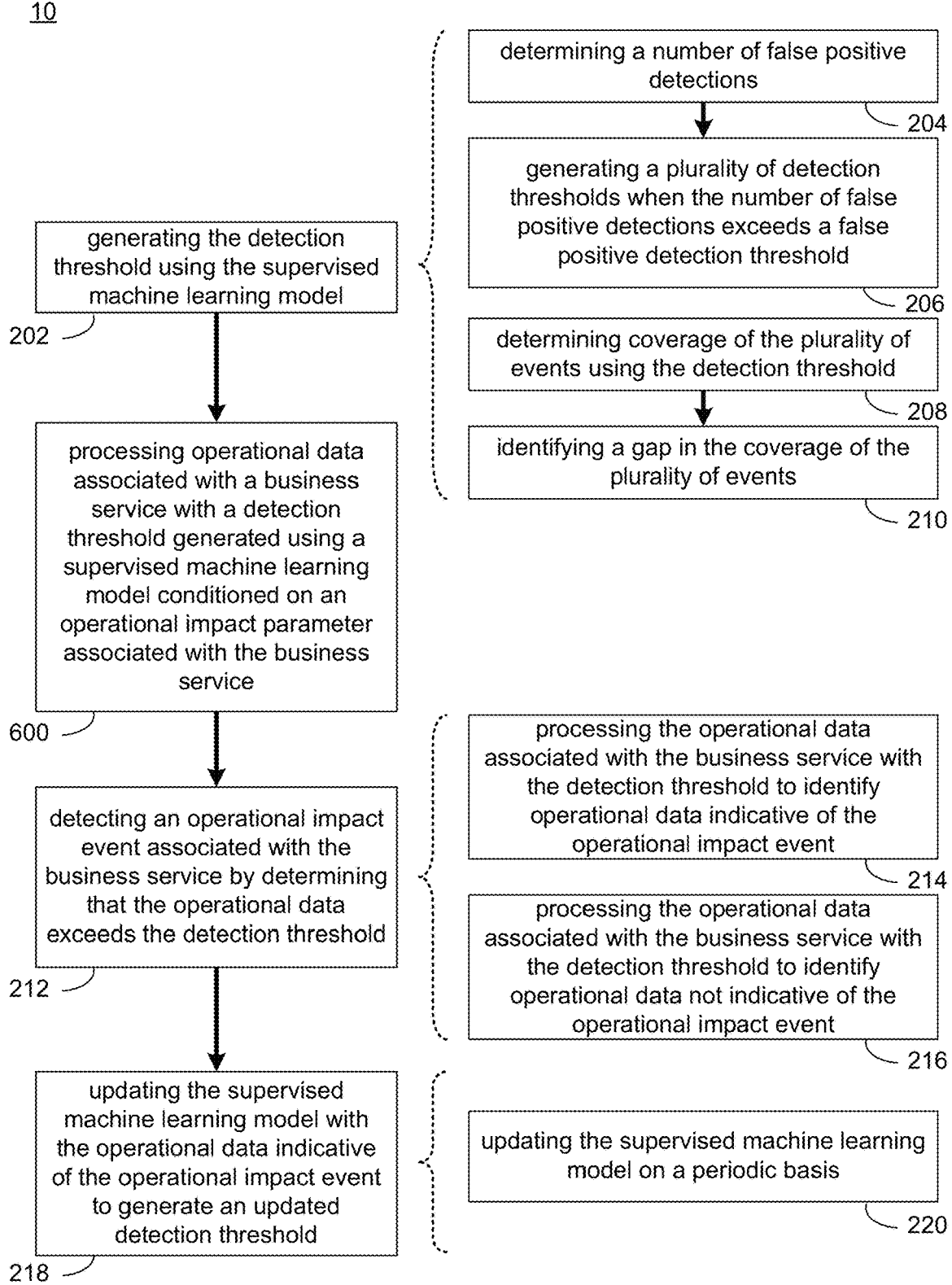
FIG. 6 is a flow chart of an example implementation of the event detection process of FIG. 1.

Referring also to FIG. 6, event detection process 10 uses a detection threshold to process 600 operational data associated with a business service with a detection threshold generated using a supervised machine learning model conditioned on an operational impact parameter associated with the business service. In this manner, event detection process 10 may use the trained supervised machine learning model (e.g., supervised machine learning model 314) as described above to detect 212 an operational impact event associated with the business service. As such, FIGS. 2 and 6 show the training of the supervised machine learning model to generate a detection threshold and the use of the generated detection threshold to detect operational impact events.

In some implementations, event detection process 10 detects 212 an operational impact event associated with the business service by determining that the operational impact event exceeds the detection threshold. For example, event detection process 10 determines whether the operational data is or is not indicative of an operational impact event using the detection threshold. In one example, suppose that suppose a normal range of e.g., latency for a business service includes 800 milliseconds to 1,200 milliseconds. Suppose that operational data for the business service indicates that one or more users are experiencing 1,600 millisecond latency. In this example, a conventional unsupervised approach would detect an issue for the business service as the 1,600 millisecond latency is out of the acceptable or normal latency range.

Now, suppose that event detection process 10 processes a plurality of event data associated with a plurality of known operational impact events, and operational data to generate a detection threshold for latency of 3,000 milliseconds before detecting an operational impact event. In this example, event detection process 10 monitors operational data in real-time to determine whether the latency within the operational data exceeds the detection threshold (e.g., 3,000 milliseconds). In response to monitoring operational data that exceeds the detection threshold, event detection process 10 detects 202 an operational impact event. Detecting an operational impact event may include generating an alert, providing a notification to a business service administrator, updating a log of operational impact events, and/or performing various other remedial actions.

In some implementations, detecting 212 the operational impact event includes processing 214 the operational data associated with the business service with the detection threshold to identify operational data indicative of the operational impact event. As discussed above, operational data indicative of an operational impact event includes operational data that meets the criteria of the detection threshold for the operational impact parameter.

Figure 5:
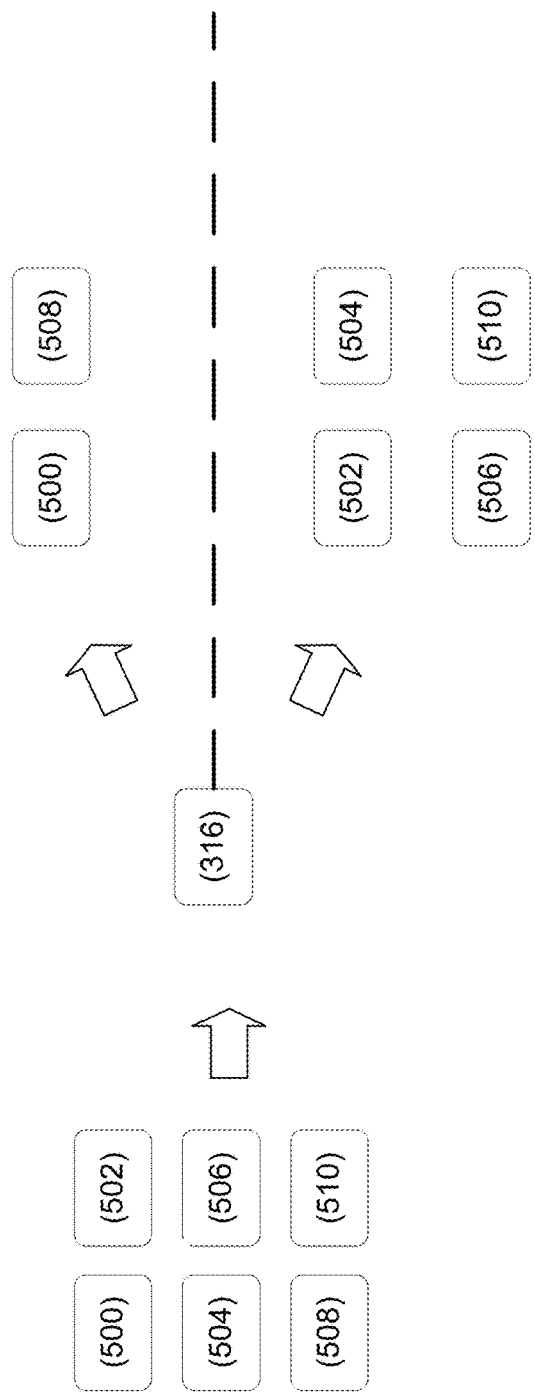

Referring also to FIG. 5, suppose that event detection process 10 receives operational data (e.g., operational data 500, 502, 504, 506, 508, 510) associated with various customers of business service 64. In this example, event detection process 10 utilizes detection threshold 316 to filter operational data that is indicative of an operational impact event from operational data that is not indicative of the operational impact event. In this example, suppose that operational data 500, 508 include latency values exceeding the latency metric of detection threshold 316 (e.g., 3,200 milliseconds and 3,300 milliseconds, respectively). In this example, event detection process 10 detects an operational impact event for operational data 500 and operational data 508 as both portions of operational data indicate that an operational impact event is occurring. As shown in FIG. 5, the broken line extending from detection threshold 316 represents event detection process 10 dividing operational data 500, 508 from the other operational data. In this example, event detection process 10 generates an alert or takes some other remedial action in response to each of operational data 500, 508.

In some implementations, detecting 212 the operational impact event includes processing 216 the operational data associated with the business service with the detection threshold to identify operational data not indicative of the operational impact event. As discussed above, operational data not indicative of an operational impact event includes operational data that fails to meet the criteria of the detection threshold for the operational impact parameter.

Referring again to FIG. 5, suppose that event detection process 10 receives operational data (e.g., operational data 500, 502, 504, 506, 508, 510) associated with various customers of business service 64 and utilizes detection threshold 316 to filter operational data that is indicative of an operational impact event from operational data that is not indicative of the operational impact event. In this example, suppose that operational data 502, 504, 506, 510 include latency values below the latency metric of detection threshold 316. In this example, event detection process 10 does not detect an operational impact event for any of operational data 502, 504, 506, 510 as none of the portions of operational data indicate that an operational impact event is occurring. As shown in FIG. 5, the broken line extending from detection threshold 316 represents event detection process 10 dividing operational data 502, 504, 506, 510 from the operational data 500, 508. In this example, event detection process 10 may continue processing operational data to monitor for operational data that exceeds detection threshold 316.

Figure 7:
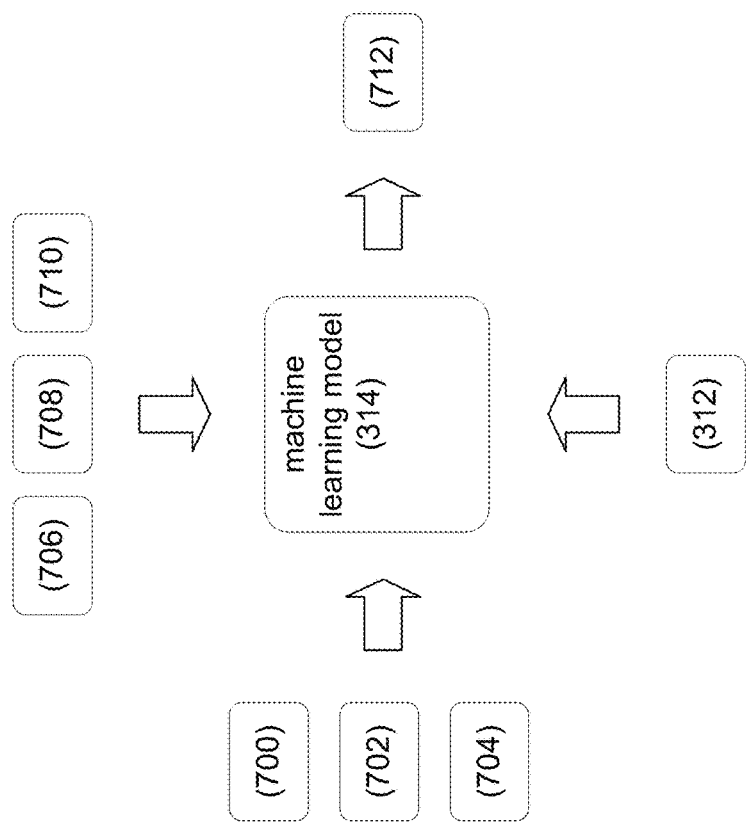
FIG. 7 is a diagrammatic view of an example event detection process of FIG. 1.

In some implementations, event detection process 10 updates 218 the supervised machine learning model with the operational data indicative of the operational impact event to generate an updated detection threshold. For example, event detection process 10 may update 218 the supervised machine learning model to account for subsequent (i.e., any point in time after a previous training of the supervised machine learning model) operational data indicative of an operational impact event. Referring also to FIG. 7 and in some implementations, suppose event detection process 10 processes subsequent operational impact events (e.g., operational impact events 700, 702, 704) and subsequent operational data (e.g., operational data 706, 708, 710). In this example, event detection process 10 updates 218 the detection threshold (e.g., detection threshold 712) by processing operational impact events 700, 702, 704 and operational data 706, 708, 710 in the manner described above. For example, event detection process 10 conditions supervised machine learning model 314 on the operational impact parameter (e.g., operational impact parameter 312). In some implementations, the operational impact parameter may be adjusted over time to restrict or loosen the detection threshold for various parameters.

In some implementations, updating 218 the supervised machine learning model with the operational data indicative of the operational impact event includes updating 220 the supervised machine learning model on a periodic basis. For example, event detection process 10 may update 220 supervised machine learning model 314 at various intervals. In one example, event detection process 10 updates 220 supervised machine learning model 314 after a threshold amount of time and/or on a periodic basis. In this example, event detection process 10 updates 220 supervised machine learning model 314 e.g., every day. In another example, event detection process 10 updates 220 supervised machine learning model 314 e.g., every hour. While various time periods have been described for updating the supervised machine learning model, it will be appreciated that these are for example purposes only and that event detection process 10 may update 220 the supervised machine learning model at any interval within the scope of the present disclosure.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example, an electronic, magnetic, optical, electromagnetic, infrared, or semiconductor system, apparatus, device, or propagation medium. More specific examples of the computer-readable medium include the following: an electrical connection having one or more wires, a hard disk, a random access memory (RAM), a read-only memory (ROM), an erasable programmable ROM (EPROM or Flash memory), an optical fiber, a portable compact disc ROM (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network, a wide area network, or the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    processing event data associated with a plurality of known operational impact events on a cloud computing service and operational data associated with the cloud computing service using a supervised machine learning model conditioned on an operational impact parameter associated with the cloud computing service, wherein the operational impact parameter is a parameter used for determining a lowest detection threshold to achieve a particular performance metric of the cloud computing service;
    generating a detection threshold using the supervised machine learning model;
    identifying a gap in coverage of the plurality of known operational impact events by:
        identifying uncovered operational data and a plurality of uncovered known operational impact events, wherein the uncovered operational data and the plurality of uncovered known operational impact events are unreported when using the detection threshold;
    updating a monitoring configuration associated with a business service based upon, at least in part, the gap in the coverage of the plurality of known operational impact events;
    generating an updated detection threshold based upon, at least in part, the gap in the coverage of the plurality of known operational impact events; and
    updating the supervised machine learning model with the operational data indicative of an operational impact event associated with the business service on a periodic basis to continually generate the updated detection threshold, wherein updating the supervised machine learning model continually generates the updated detection threshold by modifying the updated detection threshold to filter out noisy operational data associated with the cloud computing service that is not indicative of an operational impact event from detection of future operational impact events.

2. The computer-implemented method of claim 1, wherein generating the detection threshold using the supervised machine learning model includes:
    determining a number of false positive detections; and
    generating a plurality of detection thresholds when the number of false positive detections exceeds a false positive detection threshold.

3. The computer-implemented method of claim 1, further comprising:

determining the coverage of the plurality of known operational impact events using the detection threshold.

4. The computer-implemented method of claim 1, further comprising:
   detecting the operational impact event associated with the business service by determining that the operational data exceeds the detection threshold.

5. The computer-implemented method of claim 4, wherein detecting the operational impact event includes processing the operational data associated with the business service with the detection threshold to identify operational data indicative of the operational impact event.

6. The computer-implemented method of claim 5, wherein detecting the operational impact event includes processing the operational data associated with the business service with the detection threshold to identify operational data not indicative of the operational impact event.

7. A computing system comprising:
   a processing system comprising a processor; and
   a memory storing instructions that, when executed by the processing system, cause the system to perform operations comprising:
      processing event data associated with a plurality of known operational impact events on a cloud computing service and operational data associated with the cloud computing service using a supervised machine learning model conditioned on an operational impact parameter associated with the cloud computing service, wherein the operational impact parameter is a parameter used for determining a lowest detection threshold to achieve a particular performance metric of the cloud computing service;
      generating a detection threshold using the supervised machine learning model;
      identifying a gap in coverage of the plurality of known operational impact events by:
         identifying uncovered operational data and a plurality of uncovered known operational impact events, wherein the uncovered operational data and the plurality of uncovered known operational impact events are unreported when using the detection threshold;
      updating a monitoring configuration associated with a business service based upon, at least in part, the gap in the coverage of the plurality of known operational impact events;
      generating an updated detection threshold based upon, at least in part, the gap in the coverage of the plurality of known operational impact events; and
      updating the supervised machine learning model with the operational data indicative of an operational impact event associated with the business service on a periodic basis to continually generate the updated detection threshold, wherein updating the supervised machine learning model continually generates the updated detection threshold by modifying the updated detection threshold to filter out noisy operational data associated with the cloud computing service that is not indicative of an operational impact event from detection of future operational impact events.

8. The computing system of claim 7, wherein the operations further comprise:
   generating the detection threshold using the supervised machine learning model.

9. The computing system of claim 8, wherein generating the detection threshold by processing event data associated with the plurality of known operational impact events on the business service and operational data associated with the business service using the supervised machine learning model includes:
   determining a number of false positive detections; and
   generating a plurality of detection thresholds when the number of false positive detections exceeds a false positive detection threshold.

10. The computing system of claim 8, wherein the operations further comprise:
   determining the coverage of the plurality of known operational impact events using the detection threshold.

11. The computing system of claim 7, wherein detecting the operational impact event includes processing subsequent operational data associated with the cloud computing service with the detection threshold to identify operational data indicative of the operational impact event.

12. The computing system of claim 11, wherein detecting the operational impact event includes processing the operational data associated with the cloud computing service with the detection threshold to identify operational data not indicative of the operational impact event.

13. A computer program product residing on a non-transitory computer readable medium having a plurality of instructions stored thereon which, when executed by a processor, cause the processor to perform operations comprising:
   generating a detection threshold by processing a plurality of event data associated with a plurality of known operational impact events of a cloud computing service, respectively, and service level indicator (SLI) data associated with the cloud computing service using a supervised machine learning model conditioned on an operational impact parameter associated with the cloud computing service, wherein the operational impact parameter is a parameter used for determining a lowest detection threshold to achieve a particular performance metric of the cloud computing service;
   identifying a gap in coverage of the plurality of known operational impact events by:
      identifying uncovered operational data and a plurality of uncovered known operational impact events, wherein the uncovered operational data and the plurality of uncovered known operational impact events are unreported when using the detection threshold;
   updating the SLI data associated with the cloud computing service based upon, at least in part, the gap in the coverage of the plurality of known operational impact events;
   generating an updated detection threshold based upon, at least in part, the gap in the coverage of the plurality of known operational impact events;
   updating the supervised machine learning model with the SLI data indicative of an operational impact event associated with the cloud computing service on a periodic basis to continually generate the updated detection threshold, wherein updating the supervised machine learning model continually generates the updated detection threshold by modifying the updated detection threshold to filter out noisy operational data associated with the cloud computing service that is not indicative of an operational impact event from detection of future operational impact events; and
   detecting the operational impact event by determining that the operational data exceeds the detection threshold.

14. The computer program product of claim 13, wherein processing the plurality of event data and the SLI data associated with the cloud computing service using the supervised machine learning model includes:
- determining a number of false positive detections; and
- generating a plurality of detection thresholds when the number of false positive detections exceeds a false positive detection threshold.

15. The computer program product of claim 13, wherein the operations further comprise:
- determining the coverage of the plurality of operational impact events using the detection threshold.

16. The computer program product of claim 13, wherein detecting the operational impact event includes processing the SLI data associated with the operational impact service with the detection threshold to identify SLI data indicative of the operational impact event.

17. The computer program product of claim 16, wherein detecting the operational impact event includes processing the SLI data associated with the cloud computing service with the detection threshold to identify SLI data not indicative of the operational impact event.

\* \* \* \* \*